United States Patent [19]

McFadden

[11] Patent Number: 5,365,356
[45] Date of Patent: Nov. 15, 1994

[54] METHOD OF FABRICATING AN ENCAPSULATED LIQUID CRYSTAL DISPLAY

[75] Inventor: Francis J. McFadden, Lake Elmo, Minn.

[73] Assignee: Minnesota Mining and Manufacturing Company, St. Paul, Minn.

[21] Appl. No.: 214,356

[22] Filed: Mar. 16, 1994

Related U.S. Application Data

[62] Division of Ser. No. 928,505, Aug. 11, 1992, abandoned.

[51] Int. Cl.$^5$ .............................................. G02F 1/13
[52] U.S. Cl. .................................. 359/62; 359/74; 359/80; 359/81; 359/82; 430/20
[58] Field of Search ............... 359/62, 74, 80, 81, 359/82, 83, 100; 428/1; 430/20; 445/24; 156/145

[56] References Cited

U.S. PATENT DOCUMENTS

| | | | |
|---|---|---|---|
| 3,866,313 | 2/1975 | Yih | 359/80 |
| 4,256,787 | 3/1981 | Shaver et al. | 359/63 |
| 4,367,924 | 1/1983 | Clark et al. | 359/56 |
| 4,536,059 | 8/1985 | van den Berk | 359/55 |
| 4,563,059 | 1/1986 | Clark et al. | 359/76 |
| 4,626,303 | 12/1986 | Ogura | 359/80 |
| 4,640,583 | 2/1987 | Hoshikawa et al. | 359/80 |
| 4,682,858 | 7/1987 | Kanbe et al. | 359/81 |
| 4,691,995 | 9/1987 | Yamazaki et al. | 359/80 |
| 4,709,991 | 12/1987 | Hoshikawa | 359/70 |
| 4,715,686 | 12/1987 | Iwashita et al. | 359/74 |
| 4,763,995 | 8/1988 | Katagiri et al. | 359/76 |
| 4,834,500 | 5/1989 | Hilsum et al. | 359/43 |
| 4,834,509 | 5/1989 | Gunjima et al. | 359/52 |
| 4,917,473 | 4/1990 | Watanabe | 359/80 |
| 4,952,036 | 8/1990 | Gulick et al. | 359/48 |
| 5,177,629 | 1/1993 | Bohannon | 359/73 |
| 5,179,459 | 1/1993 | Plesinger | 359/74 |
| 5,193,019 | 3/1993 | Watanabe | 359/80 |
| 5,268,782 | 12/1993 | Wenz et al. | 359/81 |
| 5,292,625 | 3/1994 | McFadden et al. | 430/325 |

FOREIGN PATENT DOCUMENTS

0186911  7/1989  Japan .................................. 359/74

OTHER PUBLICATIONS

"Norland Optical Adhesive 68," (Nov. 1989) Norland Products, New Brunswick, N.J.

Primary Examiner—William L. Sikes
Assistant Examiner—Tai V. Duong
Attorney, Agent, or Firm—Gary L. Griswold; Walter N. Kirn; Eric D. Levinson

[57] ABSTRACT

A method of fabricating an encapsulated liquid crystal display includes adhering a pair of rectangular, interior substrates, at least one of which is flexible, to each other on three of the four sides of their peripheries. A liquid crystal material is then introduced between the interior substrates. The interior substrates are placed between a pair of rigid exterior substrates. A transparent resin is then applied between the interior substrates and the exterior substrates. The exterior substrates are forced toward the interior substrates. The transparent resin is then cured, thereby adhering the interior substrates to the exterior substrates.

7 Claims, 3 Drawing Sheets

METHOD OF FABRICATING AN ENCAPSULATED LIQUID CRYSTAL DISPLAY

This is a division of application Ser. No. 07/928,505 filed Aug. 11, 1992, now abandoned.

FIELD OF THE INVENTION

The present invention relates to liquid crystal display devices and a method of fabricating such devices.

BACKGROUND OF THE INVENTION

Liquid crystal display (LCD) devices are well known and are useful in a number of applications where a light weight, low-power, flat-panel display is desired. Typically, these devices comprise a pair of sheet-like, glass substrate elements or "half-cells" overlying one another with liquid crystal material confined between the glass substrates. The substrates are sealed at their periphery with a sealant to form the cell or device. Transparent electrodes are generally applied to the interior surface of the substrates to allow the application of an electric field at various points on the substrates thereby forming addressable pixel areas on the display.

Various types of liquid crystal materials are known in the art and are useful in devices referred to as twisted nematic (TN), super twisted nematic (STN) and ferroelectric (FE) display devices. The ferroelectric liquid crystals are particularly useful due to their bistable characteristics, fast switching times, and good contrast in large area displays. Ferroelectric liquid crystals are comprised of molecules having a polarization vector that aligns with an applied electric field. Thus, the application of an electric field ("field-on condition") causes these liquid crystal molecules to orient in a characteristic way. Because they are bistable materials, they remain as oriented by the field even after the orienting electric field is removed ("field-off condition") thereby reducing power consumption. Application of a field of different polarity can re-orient the liquid crystal materials to a different orientation characteristic of the field. Because the liquid crystals affect light differently in different orientations, they can be made to effectively switch picture elements (pixels) in a display device on and off to display information as is well known in the art. Ferroelectric liquid crystal materials and display devices are described in U.S. Pat. No. 4,367,924 entitled "Chiral Smectic C or H Liquid Crystal Electro-Optical Device" and U.S. Pat. No. 4,563,059 entitled "Surface Stabilized Ferroelectric Liquid Crystal Devices".

LCD devices can be made with either flexible or rigid optically transparent non-birefringent substrates. If rigid substrates are used, the substrates must be optically flat. This is because small variations in the separation of the two substrates affect the electric field created in the LCD material, which in turn affects the performance of the LCD device.

If flexible substrates are used to form the LCD device, the substrates need not be optically flat because the substrates can bend to conform to each other. Flexible substrates are, however, more likely to delaminate than rigid substrates. Delamination results in air entering the LCD cell, which creates air bubbles in the LCD material, thereby changing the spacing of the substrates. Delamination also allows moisture to enter the LCD cell, which can result in the creation of dead zones, i.e., defective pixels, within the LCD cell.

Delamination can be prevented by applying epoxy between the interior substrates. However, great care must be taken during the application of the epoxy to ensure that its thickness does not affect the spacing between the substrates, which can lower the contrast of the LCD cell. Furthermore, the epoxy must be of a type that will not chemically react with the liquid crystal material.

It would be desirable to have an LCD device which combines the advantages of flexible substrates with the advantages of rigid substrates, without the attendant disadvantages of either.

SUMMARY OF THE INVENTION

The present invention eliminates the need for an optically flat substrate because the use of at least one flexible interior substrate ensures a uniform spacing between the two interior substrates, and thus uniform thickness of the liquid crystal material. The present invention also eliminates the need to apply epoxy between the interior substrates because pressure applied on the interior substrates by the rigid exterior substrates prevents the interior substrates from delaminating.

The present invention includes a method for fabricating an encapsulated liquid crystal display. The method includes adhering a pair of rectangular, interior substrates, at least one of which is flexible, to each other on three of the four sides of their peripheries. A liquid crystal material is then introduced between the interior substrates. The interior substrates are placed between a pair of rigid exterior substrates. A transparent resin is then applied between the interior substrates and the exterior substrates. The exterior substrates are forced toward the interior substrates. The transparent resin is then cured, thereby adhering the interior substrates to the exterior substrates.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE DRAWINGS

A method of fabricating an encapsulated liquid crystal display (LCD) according to the present invention will now be explained with reference to FIGS. 1A through 6. The method will be divided into three stages:

(1) describing the materials, (2) filling an LCD cell, and (3) encapsulating a filled LCD cell. The method described herein is applicable to many types of LCD's, including those which use ferroelectric (FE) or twisted nematic (TN) liquid crystal materials as the optically active filling material.

Both FE and TN filled LCD's are characterized by electrically switchable optical rotation. Thus, with these filling materials it is necessary that all of the other materials used to fabricate the LCD cell exhibit low optical birefringence to maximize the contrast ratio between the on-state and the off-state of the LCD cell. The method described herein may also be applicable to LCD's which create optical contrast by some phenomenon other than optical rotation. The following description, however, is for an LCD susceptible to optical rotation by an electric field.

The Materials

Figure 1A:
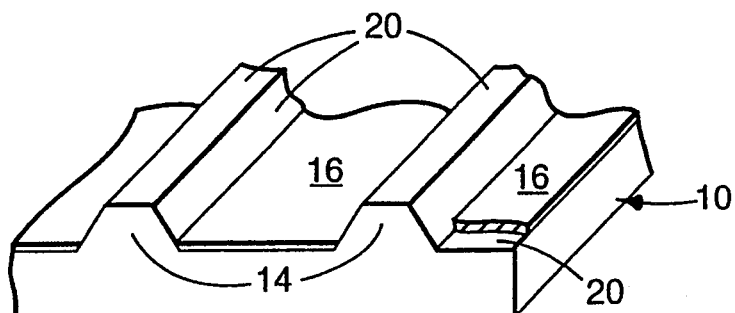
FIGS. 1A and 1B are perspective views of interior substrates according to the present invention.
Figure 1B:
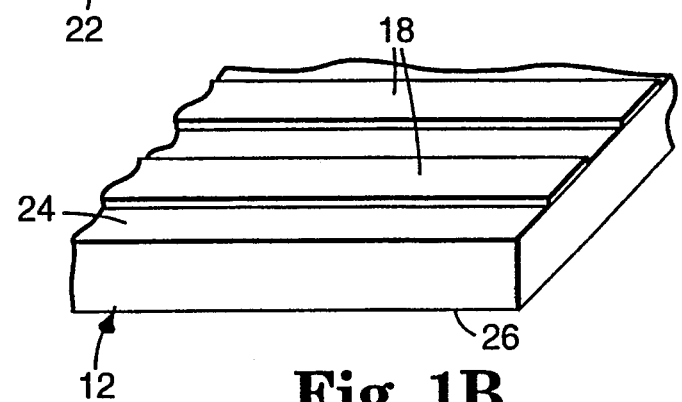

An LCD cell is comprised of two interior substrates: a front substrate 10 and a back substrate 12, as shown in FIGS. 1A and 1B. The substrates 10 and 12 are preferably rectangular. The front substrate 10 has molded spacer ridges 14 which define the width of the gap between the two interior substrates 10 and 12 when the LCD is assembled. The ridges 14 are preferably parallel to each other and of uniform height. The ridges 14 are preferably within the range of from about 1 to 10 $\mu$m in height and 10 to 500 $\mu$m in width, and are separated by a distance within the range of from about 75 $\mu$m to 1 mm. Although the ridges 14 are preferred for maintaining a uniform gap between the two interior substrates 10 and 12, other spacing elements may be used in their place.

The front substrate 10 has an inner major surface 20 and an outer major surface 22. The front substrate 10 is coated with a layer of electrically conductive, optically transparent material 16 on the portions of the inner major surface 20 between the ridges 14. This conductive material 16 forms the X address lines of the LCD cell. The conductive material 16 is preferably about 70 nm thick and can be indium-tin-oxide (ITO).

Typically, the conductive material 16 is vapor deposited onto the interior surface 20 of the substrate 10 by sputtering or other commonly known techniques. Because vapor deposition techniques are not able to be directed with sufficient accuracy, the conductive material 16 may be deposited on the tops of the spacer ridges 14. If left in place, this conductive region could possibly short across the electrode regions on the mating substrate 12. Various techniques can be used to remove the conductive coating from the tops of the ridges 14, including, for example, burnishing the tops of the ridges after deposition, etching the conductive layer off while protecting the desired electrode surface with photoresist, etc. When the etching technique is used, a positive photoresist is applied to the entire inner major surface 20 of the substrate 10. The photoresist on the tops of the ridges 14 can be exposed to light by the use of a laser selectively targeted on the ridge tops or by the use of a prism atop the ridges so that light is transmitted to the photoresist at the prism/photoresist interface, but is reflected at the prism/air interface so that the photoresist over the electrodes is not exposed. The photoresist on the tops of the ridges 14 is removed and the inner major surface 20 of the substrate surface 10 exposed to an etchant. After the conductive layer on the tops of the ridges 14 is removed, the photoresist over the electrode areas is stripped away and the alignment coating and/or other materials applied as desired.

The conductive coating can also be etched off the tops of the ridges 14 by applying a positive photoresist to the entire major surface 20 of the substrate 10 and then placing a mask having transparent stripes aligned over the tops of the ridges and several opaque stripes aligned over the spacing between the ridges. Collimated ultra-violet light is then directed toward the mask, thereby exposing the photoresist on the tops of the ridges 14. The conductive layer on the tops of the ridges 14 and the remaining photoresist can then be removed using the standard photoresist techniques described above.

The back substrate 12 has an inner major surface 24 and an outer major surface 26. The inner major surface 24 of the back substrate 12 is preferably coated with parallel stripes 18 of the same material used for the electrically conductive, optically transparent material 16 of the front substrate 10. These conductive stripes 18 form the Y address lines of the LCD cell.

One or both of the inner major surfaces 20 and 24 of the interior substrates 10 and 12, respectively, can be further coated with a thin layer of polymeric material (not shown). This polymeric layer is commonly called an alignment layer because it is used to cause a desired orientation of the liquid crystal material at its interface with the inner major surfaces 20 and 24 of the interior substrates 10 and 12, respectively. This ensures that the liquid crystal rotates light through angles which are complementary to the alignment of the polarizers (not shown) associated with the LCD cell. The alignment compositions useful in the present invention are well known in the art. These compositions include various polymeric materials applied from solvents by spin coating or other techniques commonly used which will apply a thin, uniform coating across the surface of the substrate. Once applied, these materials are dried and rubbed with cloth or other materials to provide an orienting surface which will align liquid crystal molecules in contact with the surface. A preferred alignment material is a nylon polymer which can be solvent coated and rubbed with cloth, such as velvet, to provide a useful alignment layer.

At least one of the interior substrates 10 and 12 must be flexible enough to be made conformable to the other substrate by applying a uniform pressure from the outer surfaces of the substrates. The interior substrates 10 and 12 should be made of a material that exhibits low absorption of moisture and is chemically compatible with the liquid crystal material that is used. The material used to form the interior substrates 10 and 12 should also have a glass transition temperature ($T_g$) which is higher than any temperature that the substrates are exposed to during the subsequent processing. The interior substrates 10 and 12 should have little or no birefringence and should be optically transparent in the visible part of the spectrum. Preferable materials for the interior substrates include various polymeric materials such as polymethyl methacrylate (PMMA), polystyrene (PS), polyethersulfone (PES), polycarbonate (PC), polyester, and compounds of the polyolefin family, such as Zeonex ™, available from Nippon Zeon Co., Ltd., Tokyo, Japan.

Filling an LCD Cell

Figure 2A:
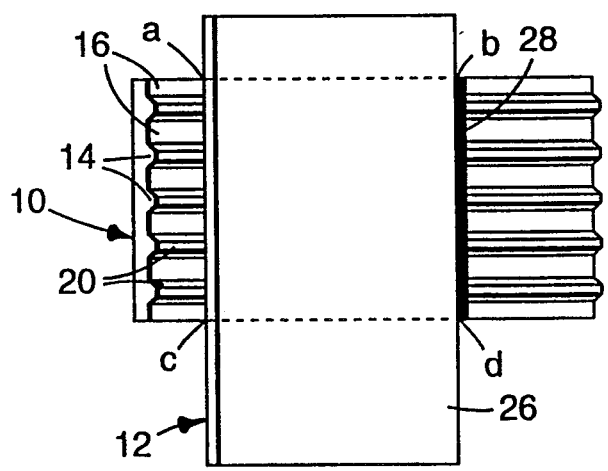
FIGS. 2A and 2B are isometric views illustrating the method of the present invention for attaching two interior substrates to each other.

An LCD cell is prepared for filling by placing the back substrate 12 over the front substrate 10 so that the inner major surface 20 of the front substrate 10 faces the inner major surface 24 of the back substrate 12, as shown in FIG. 2A. The two substrates 10 and 12 should preferably be oriented so that the ridges 14 of the front substrate 10 are perpendicular to the stripes 18 of the back substrate 12.

A thin fillet of curable, transparent resin 28, preferably curable in ultra-violet (UV) light, is placed along the edge bd as shown in FIG. 2a. Pressure is applied to the outer major surfaces 22 and 26 to force the inner major surfaces 20 and 24 of the two interior substrates 10 and 12, respectively, together. Simultaneously, the resin 28 is partially cured, for example, by a UV light source, thus sealing that edge.

Figure 2B:
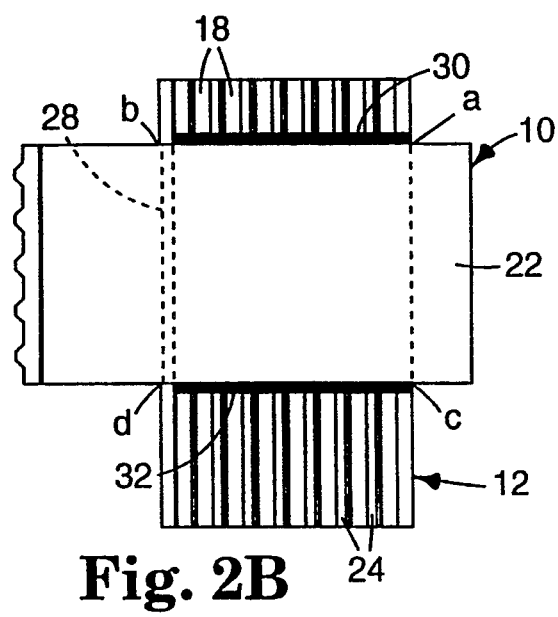

The interior substrates 10 and 12 are then flipped over, as shown in FIG. 2B. Fillets of curable, transparent resin 30 and 32 are then applied along lines ab and cd. Pressure is again applied to the outer major surfaces 22 and 26 to force the inner major surfaces 20 and 24 of the two substrates 10 and 12, respectively, together. The resins 30 and 32 are then partially cured, thus sealing those edges, leaving only one remaining edge ac unsealed.

Figure 3:
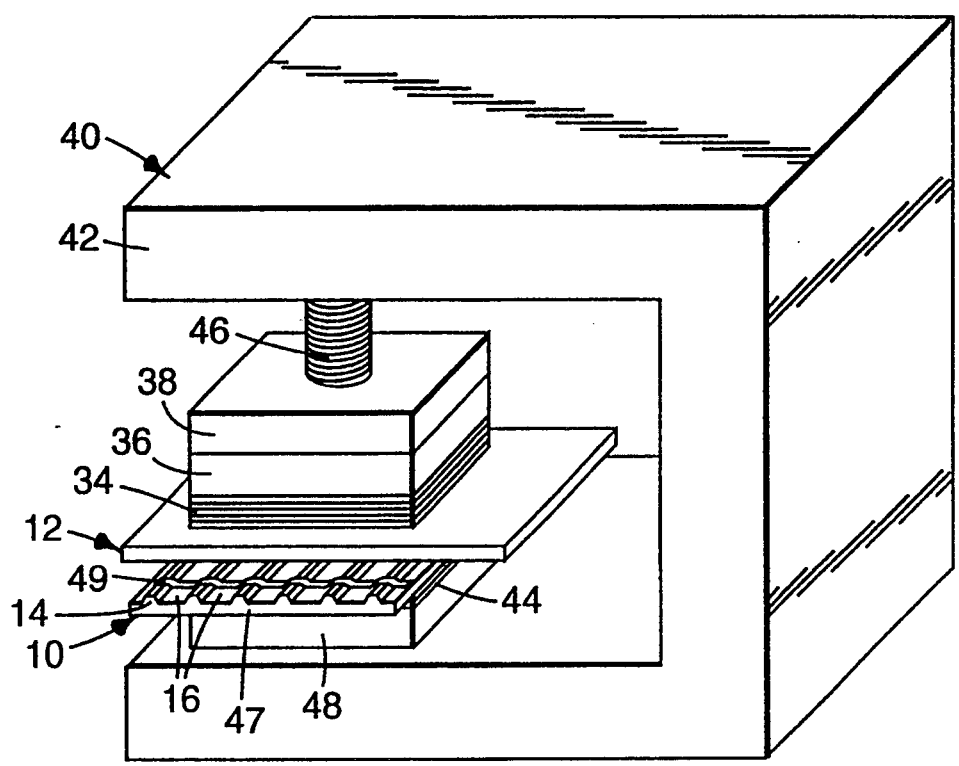
FIG. 3 is a perspective view of a filling fixture for filling a gap between two interior substrates with a liquid crystal material according to the present invention.

The two interior substrates 10 and 12 are then placed between a stack of spacers as shown in FIG. 3. The stack of spacers includes paper layers 34 and 44, a resilient pad 36, and upper and lower platens 38 and 48, respectively. The stack of spacers should have a cross-sectional area slightly smaller than the active area of the liquid crystal module (LCM) formed by the two interior substrates 10 and 12. The two interior substrates 10 and 12 are placed between the paper layers 34 and 44, which each preferably include about 2–4 sheets of paper. The upper platen 38 is located above the paper layer 34. The lower platen 48 is located just below the paper layer 44.

The entire stack of spacers and the LCM (comprised of the two interior substrates 10 and 12) are then placed on a filling fixture 40 comprised of a frame 42 and a spring 46. The spring 46 can be replaced by another means of applying force, such as a pneumatic cylinder with controlled pressure. The spring 46 forces the upper platen 38 towards the lower platen 48, thereby forcing the inner major surface 20 of front substrate 10 toward the inner major surface 24 of back substrate 12. The purpose of the filling fixture 40 is to provide uniform pressure on the outer major surfaces 22 and 26 of the substrates 10 and 12, respectively, thereby ensuring that the tops of the ridges 14 of the front substrate 10 are uniformly in contact with the inner major surface 24 of the back substrate 12.

The paper layers 34 and 44 serve to transmit vertical pressure from the platens 38 and 48 to the LCM while minimizing the amount of transverse distortion of the LCM caused by the pressure exerted by the spring 46. The resilient pad 36 should be placed on a side of the LCM having a flexible substrate, between the paper layer 34 and the upper platen 38, as shown in FIG. 3. The resilient pad 36 helps to distribute the force from the spring 46 evenly over the area of the flexible substrate.

Many twisted nematic (TN) liquid crystal materials will readily flow at room temperature whereas most ferroelectric (FE) materials will not. Therefore, a slightly different filling procedure is used depending on whether TN or FE liquid crystal materials are being used.

If a ferroelectric (FE) liquid crystal material is used, then a thin bead of liquid crystal material 49 is applied along the edge of the inner major surface 20 of the front substrate 10 adjacent unsealed edge ac, as shown in FIG. 3. The filling fixture 40 holding the stack of spacers and the LCM is then placed in a vacuum oven (not shown). The oven is then evacuated to a pressure differential of about 28 inches (710 mm) of mercury. The oven is heated to a temperature at which the FE liquid crystal material goes through a phase transition to its isotropic state, typically about 95° C. During the heating phase, the FE liquid crystal material 49 is degassed of any absorbed gasses. When the FE material 49 reaches a temperature in its isotropic phase region, the material flows through the channels on the inner major surface 20 of the front substrate 10 between the ridges 14 and begins to fill the gap between the inner major surfaces 20 and 24 of the interior substrates 10 and 12, respectively, due to capillary action. When the liquid crystal material begins to flow, the vacuum pump (not shown) is turned off, and dry nitrogen gas is slowly let into the oven. This causes the liquid crystal material to fill the LCM faster than if capillary action alone were used. When the pressure in the oven reaches atmospheric pressure, the oven heater (not shown) is shut off and the oven is allowed to cool slowly back to room temperature before the filling fixture 40 (holding the stack of spacers and the LCM) is removed. The rate at which the vacuum oven is cooled back to room temperature will depend, in general, upon the type of liquid crystal material being used. For a typical FE liquid crystal material, the oven might be cooled from about 95° C. to room temperature in about four hours. This completes the filling procedure.

If a twisted nematic (TN) liquid crystal material is used, then the filling fixture 40 holding the stack of spacers and the LCM is rotated 90 degrees counter-clockwise from the vertical so that face 47 of the substrate 10 is facing downward. A shallow dish (not shown) containing the TN liquid crystal material is placed below the face 47. The filling fixture 40 and the dish are then placed in a vacuum chamber (not shown) which is then evacuated to a pressure differential of about 28 inches (710 mm) of mercury. After the vacuum chamber has degassed the TN liquid crystal material, the shallow dish is raised until the face 47 of the substrate 10 is immersed deep enough in the TN liquid crystal material so that the edge of the substrate 12 contacts the liquid crystal material. The TN liquid crystal material will then begin to fill the gap between the interior substrates 10 and 12 due to capillary action. When the liquid crystal material begins to flow, the vacuum pump is turned off, and dry nitrogen gas is slowly let into the oven to facilitate the filling of the LCM. The filled LCM can be removed from the vacuum chamber once the pressure in the chamber returns to atmospheric pressure.

Encapsulating a Filled LCD Cell

This step consists essentially of potting the filled LCM between two rigid, optically transparent exterior substrates. The purpose of this is to further seal the edges of the filled LCM and to prevent any delamination of the substrates 10 and 12 that might otherwise occur.

Figure 4:
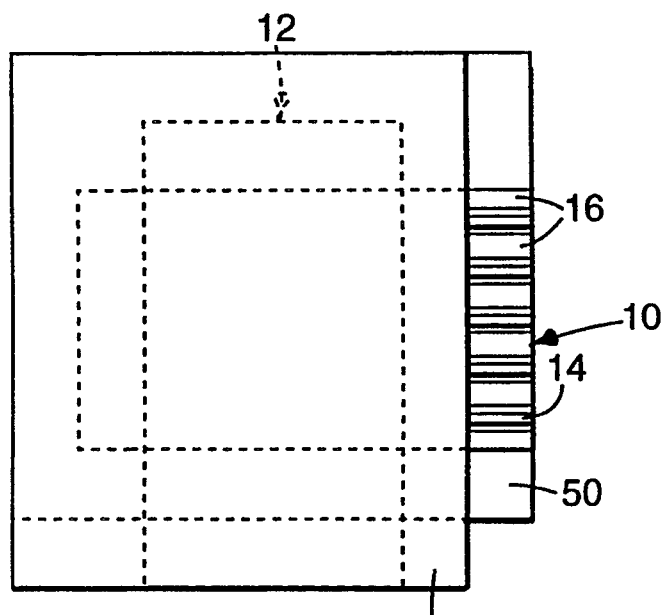
FIG. 4 is an overhead view showing the relative shapes and sizes of the interior and exterior substrates according to the present invention.

The relative sizes and shapes of the two exterior substrates 50 and 52 are shown in FIG. 4. The exterior substrate 52 must be large enough to completely cover the interior substrates 10 and 12, with the exception that a portion of the interior substrate 10 is left uncovered so that the electrical connections to the X address lines can be made. The exterior substrate 50 must be large enough to completely cover the interior substrates 10 and 12, with the exception that a portion of the interior substrate 12 is left uncovered so that the electrical connections to the Y address lines can be made. The substrates 50 and 52 are preferably rectangular, as shown in FIG. 4, although other shapes are possible.

Figure 5A:
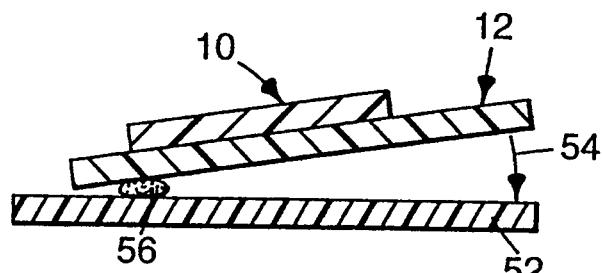
FIGS. 5A and 5B are cross-sectional side views illustrating the method of the present invention for encapsulating the interior substrates between the exterior substrates.

The process of encapsulating the filled LCM is begun by placing a bead of transparent resin 56, preferably curable in ultra-violet light, on the exterior substrate 52, as shown in FIG. 5A. The LCM, which includes the interior substrates 10 and 12, is then placed in contact with the resin bead 56. The LCM is then pressed down against the exterior substrate 52 to spread the resin bead 56 in such a way as to avoid air pockets in the resin between the interior substrate 12 and the exterior substrate 52, as indicated by an arrow 54 in FIG. 5B. This is accomplished by pressing down the LCM toward the exterior substrate 52, thereby extruding excess resin 56 from between the LCM and the exterior substrate 52.

Figure 5B:
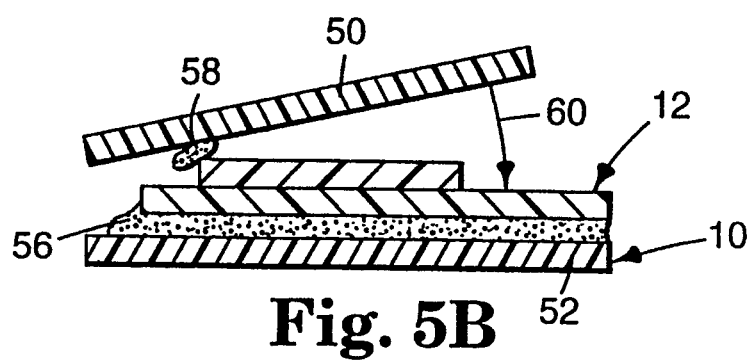

Next, a second bead of curable, transparent resin 58, also preferably curable in ultraviolet light, is placed along the edge of the exterior substrate 52, as shown in FIG. 5B. The resin 58 is then contacted along one edge of the exterior substrate 50 and is pressed down in the direction of an arrow 60 toward the LCM to spread out the resin 58 in such a way as to avoid air pockets in the resin between the interior substrate 10 and the exterior substrate 50. Finally, the resin 56 and 58 between the two exterior substrates 50 and 52 is cured, e.g., by subjecting the resin to ultraviolet light directed perpendicular to the exterior substrates. This step also completes the curing of the resins 28, 30 and 32.

Figure 6:
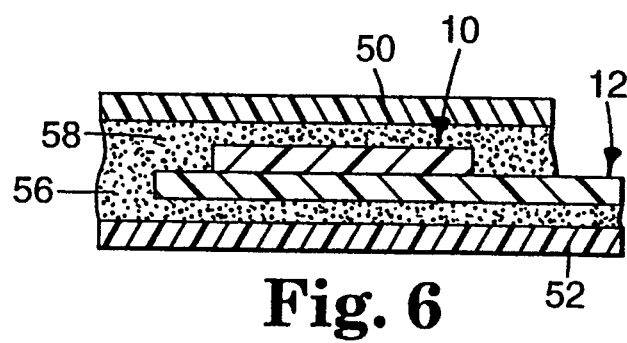
FIG. 6 is a cross-sectional side view of an encapsulated liquid crystal display according to the present invention.

A completed encapsulated liquid crystal display is shown in FIG. 6. The resins 56 and 58 serve to: (1) adhere the exterior substrates 50 and 52 to each other, (2) adhere the interior substrates 10 and 12 to the exterior substrates, (3) further seal the edges of the interior substrates to prevent any of the liquid crystal material 49 from leaking out, and (4) prevent delamination of the two interior substrates over time.

Different substrate materials can have different temperature coefficients of linear expansion. This is especially true where one of the substrates is flexible (such as plastic) while the other substrate is rigid (such as glass). When two materials having different temperature coefficients of linear expansion are adhered to each other, an increase in temperature will cause the material having the higher coefficient to wrap around the material having the lower coefficient. This bending problem is alleviated by the present invention's use of a pair of rigid exterior substrates having the same temperature coefficient of linear expansion. Thus, the encapsulated LCD cell does not bend one way or the other.

The resins 28, 30, 32, 56, and 58 should be slightly flexible in the cured state so that they are capable of absorbing the stresses caused by the different temperature coefficients of linear expansion of the various substrates. The resins should also be transparent in the visible portion of the spectrum and be chemically compatible with common liquid crystal materials. The resins should be nonbirefringent, have low moisture permeability, and should have a refractive index which roughly matches the refractive index of the substrate materials. Preferred resins include thermo-setting or ultra-violet curable resins, such as Norland Optical Adhesive #68 available from Norland Products, Inc., New Brunswick, N.J. If a thermo-setting resin is used, then the exterior substrates 50 and 52 need not be transparent to ultra-violet light.

The exterior substrates 50 and 52 need not be optically flat because the flexibility of at least one of the interior substrates ensures a uniform spacing between the two interior substrates, and thus uniform thickness of the liquid crystal material. The exterior substrates 50 and 52 should be sufficiently rigid to ensure that the interior substrates 10 and 12 do not delaminate. The exterior substrates should also be characterized by optical transparency in the ultraviolet and visible part of the spectrum, little or no birefringence, low moisture absorption and permeability, and good resistance to abrasion. Preferred materials for the exterior substrates include the same plastic materials listed above for the interior substrates, or glasses such as soda lime, borosilicate, or fused quartz.

While it is preferable that all of the materials used in the LCD cell have little or no birefringence, it may be possible to have one of the interior substrates and/or one of the exterior substrates be made from materials which are classified as uniaxial, subject to two restrictions. First, the optic axis should lie in the plane of the substrate and be in a constant direction. Second, the illumination incident on the substrate should be polarized in the direction of or normal to the optic axis of the substrate.

A complete LCD cell also requires optical polarizers (not shown) to be bonded to the outer major surfaces of the exterior substrates. The orientation of these polarizers is determined by the parameters of the cell (material, spacing, etc.) as well as the brushing direction of any aligning layers.

The filling procedure of the present invention may produce LCD cells having a more uniform alignment layer, which results in improved contrast. A common LCD filling procedure is to seal two substrates together on all four edges, except for a hole in one of the edges. The cell is then evacuated and the liquid crystal material is injected from the hole. A consequence of this method is that the liquid crystal material flows at different rates and in different directions in various parts of the cell. This variation in the flow rate and direction may cause a variation in the alignment layer of the cell, which may in turn cause an undesirable variation in the uniformity of the contrast across the cell area.

In contrast, in the filling procedure of the present invention, the liquid crystal material enters the LCD cell along one entire edge of the cell. The liquid crystal material is then channeled in a uniform direction by the parallel raised ridges on the interior substrate. Thus, the flow of the liquid crystal material into the cell is more uniform both in direction and magnitude.

Furthermore, conventional LCD cells may contain randomly distributed spacer particles instead of ridges to maintain the cell gap. These spacer particles also affect the liquid crystal flow during filling, which may affect the local alignment around the spacer particles. In contrast, the parallel ridges used in the present invention serve to improve the uniformity of the alignment layer.

In order to create multi-colored LCD's, it may be desirable to stack two or more liquid crystal modules (i.e., the interior substrates filled with liquid crystal material) on top of one another with their corresponding pixels in vertical registration. The assembly of liquid crystal modules would then be encapsulated between a single pair of rigid exterior substrates, as discussed above.

It may also be desirable to incorporate a color polarizing filter between each module. The stack of modules and filters could be held together by thin, transparent, adhesive layers. In order to minimize parallax effects between the modules, it may be desirable to minimize the thicknesses of the interior substrates. Additional color polarizing filters may be laminated to the outer surfaces of the rigid exterior substrates.

Although the present invention has been described with reference to preferred embodiments, workers skilled in the art will recognize that changes may be made in form and detail without departing from the spirit and scope of the invention.

I claim:

1. A method of fabricating an encapsulated liquid crystal display including the steps of:
   adhering a pair of rectangular, optically transparent interior substrates, at least one of which is flexible, to each other on three of the four sides of their peripheries;
   placing a liquid crystal material between the interior substrates;
   placing the interior substrates parallel to and interposed between a pair of optically transparent, rigid exterior substrates, the substrates each having inner and outer major surfaces;
   placing a transparent resin between the outer major surfaces of the interior substrates and the inner major surfaces of the exterior substrates;
   applying pressure to the outer major surfaces of the exterior substrates to force them toward the interior substrates; and
   curing the transparent resin, thereby adhering the inner major surfaces of the exterior substrates to each other.

2. The method of fabricating a liquid crystal display of claim 1, wherein only one of the interior substrates is flexible.

3. The method of fabricating a liquid crystal display of claim 1, wherein both of the interior substrates are flexible.

4. The method of fabricating a liquid crystal display of claim 1, wherein each of the interior substrates has inner and outer major surfaces, wherein the inner major surface contacts the liquid crystal material, and wherein there is a plurality of raised spacer ridges on the inner major surface of at least one of the interior substrates.

5. The method of fabricating a liquid crystal display of claim 4, wherein the spacer ridges are parallel to each other.

6. The method of fabricating a liquid crystal display of claim 1, wherein the liquid crystal material is a ferroelectric material, and wherein the step of placing the liquid crystal material between the interior substrates includes the steps of:
   applying force to the outer surfaces of the interior substrates to force them together;
   placing the interior substrates and the liquid crystal material in a low-pressure chamber; and
   heating the interior substrates and liquid crystal material until the liquid crystal material reaches its isotropic state, thereby allowing the liquid crystal material to flow between the interior substrates.

7. The method of fabricating a liquid crystal display of claim 6, further including the step, after heating the liquid crystal material to its isotropic state, of slowly letting nitrogen gas enter the low-pressure chamber, thereby increasing the rate of flow of the liquid crystal material between the interior substrates.

* * * * *